United States Patent [19]

Gealy et al.

[11] 3,864,078

[45] Feb. 4, 1975

[54] INHIBITING COLOR CHANGE IN SOLUTIONS OF VINYLAROMATIC RESINS IN CHLORINATED SOLVENTS

[75] Inventors: William E. Gealy, Forward Township, Allegheny County; Walter A. Vrendenburgh, Pleasant Hills, both of Pa.

[73] Assignee: Hercules Incorporated, Wilmington, Del.

[22] Filed: Nov. 17, 1972

[21] Appl. No.: 307,656

[52] U.S. Cl. .............. 8/142, 117/139.5 A, 252/162, 252/172, 260/33.8 UA, 260/652.5 R

[51] Int. Cl. .......................... D06l 1/04, C07c 17/40

[58] Field of Search ............ 260/652.5 R, 33.8 UA; 8/142; 117/139.5 A, 139.5 CQ; 252/158, 162, 163, 172

[56] References Cited

UNITED STATES PATENTS

| | | | |
|---|---|---|---|
| 2,096,735 | 10/1937 | Dinley | 260/652.5 R |
| 2,096,736 | 10/1937 | Dinley | 260/652.5 R |

*Primary Examiner*—Herbert B. Guynn
*Attorney, Agent, or Firm*—Buell, Blenko and Ziesenheim

[57] ABSTRACT

Method of treating solutions, particularly dry cleaning and sizing solutions, of a vinyl aromatic resin in a chlorinated solvent with lime to inhibit color change of the solutions.

8 Claims, No Drawings

INHIBITING COLOR CHANGE IN SOLUTIONS OF VINYLAROMATIC RESINS IN CHLORINATED SOLVENTS

This invention relates to treating solutions of vinylaromatic resins in chlorinated solvents to inhibit color change in storage. More particularly the invention may be employed to treat solutions of alpha-methylstyrene/vinyl-toluene resins in perchlorethylene.

In dry cleaning of clothing and fabrics it is common to employ a solvent which will dissolve and carry away common soil, greases, and the like. Use of a solvent alone, however, ordinarily leaves the fabric soft and limp. Accordingly, a sizing agent is desirably mixed with the solvent. Upon evaporation of the solvent from the fabric, the sizing agent is left remaining within the fabric and supplies a desired size and stiffness.

Various solvents have been proposed and used for dry cleaning purposes. Among them are chlorinated solvents such as perchlorethylene. Vinylaromatic resins, such as a suitable copolymer of alpha-methylstyrene and vinyltoluene, have been employed as sizing agents. Such a resin may be dissolved in perchlorethylene prior to dry cleaning. A resin concentration of about 1 percent to 2 percent may advantageously be employed. Although the solution may be prepared in dilute form, a concentrated solution may also be prepared, shipped to the point of use, and there diluted with perchlorethylene to the desired strength. Thus a relatively small volume of strong solution may be shipped, stored, and later extended to a larger volume by dilution with additional solvent just prior to use.

A drawback of solutions of a vinylaromatic resin in a chlorinated solvent is that the solutions tend to change color and darken within a few days or weeks, and they are not then considered suitable for dry cleaning purposes. Various commercial inhibitors have been tried in an effort to overcome such darkening, but they have not been effective and satisfactory.

We have found that color change in solutions of vinyl aromatic resins in chlorinated solvents can be inhibited by treatment of the solution with lime. Preferably, we prepare a solution of resin in the solvent and then treat it with lime. We prefer to add about 5 percent lime to the solution and allow sufficient time and stirring to effect color stabilization. After lime treatment we filter the lime slurry from the solution. In a present preferred form of the invention we employ an alpha-methyl-styrene/vinyltoluene copolymer as a sizing agent, and perchlorethylene as a solvent. Other resins prepared from vinylaromatic monomers such as styrene and tertiary-butylstyrene and chlorinated solvents such as 1,1,1-trichloroethane may also be employed.

The invention is illustrated by an example. A 50 percent by weight solution of resin in solvent is prepared. The resin is an alpha-methylstyrene/vinyltoluene copolymer resin having a ring and ball softening temperature of about 120°C. Such a resin is disclosed in Powers U.S. Pat. No. 3,000,868 for "Vinyl Toluene-Alpha Methyl Styrene Polymers" and is sold by Pennsylvania Industrial Chemical Corporation under the name PICCOTEX 120. The solutuon used is prepared by stirring 150 grams of the resin with 150 grams of the solvent in a 500 milliliter glass flask at 50°C under a nitrogen atmosphere. After the solution is formed, 15 grams of lime (5 percent by weight of the solution) is added, and the mixture is stirred at a temperature of 50°C for 30 minutes. The lime is then removed by filtration.

The color of the lime treated solution thus prepared was measured by a Saybolt Chromometer, and the color was found to be Saybolt +24. After storage for 11 days in a clear glass container exposed to light, the color was still Saybolt +24. After a period of 35 days the color had fallen to Saybolt +22. A similarly prepared solution which was not treated with lime had an initial color of Saybolt +20. After 11 days storage in a dark cabinet the color had fallen to Saybolt +16 and after 35 days storage the color was Saybolt +11. Further samples were prepared in which carbon steel discs were introduced into the solution during preparation and storage. The results of the tests are shown in the following table:

TABLE 1

SUMMARY OF EXPERIMENTAL RESULTS OBTAINED BY LIME TREATMENT OF RESIN/PERCHLORETHYLENE SOLUTIONS

| Solution (1) | Conditions of Preparation: Steel Disc Present(2) | Conditions of Preparation: Saybolt Color(3) | Lime Treated | Storage Conditions(4): Fluorescent Light | Storage Conditions(4): Dark |
|---|---|---|---|---|---|
| A | Yes | +18 | Yes | X | |
| B | Yes | +18 | Yes | | X |
| C | No | +20 | No | | X |
| D | No | +20 | Yes | X | |

Saybolt Color(3)

| Solution (1) | Days after preparation and/or treatment: 0 | 1 | 2 | 3 | 4 | 7 | 8 | 9 | 10 | 11 | 35 |
|---|---|---|---|---|---|---|---|---|---|---|---|
| A | +24 | +24 | +24 | +24 | +24 | +23 | +18 | +18 | +18 | +18 | +18(5) |
| B | +24 | +24 | +23 | +22 | +21 | +20 | +20 | +20 | +20 | +20 | +19(6) |
| C | +20 | +18 | +18 | +17 | +16 | +16 | +16 | +16 | +16 | +16 | +11 |
| D | +24 | +25 | +25 | +25 | +25 | +25 | +24 | +24 | +24 | +24 | +22 |

(1) Each solution was a 50/50 solution of Alpha-Methylstyrene/Vinyltoluene resin (R & B = 120°C) in untreated (no lime) perchlorethylene prepared at 50°C under nitrogen.
(2) Steel discs present during solution preparation were also present during storage.
(3) As measured by a Saybolt Chromometer.
(4) All solutions were stored in Pyrex glass flasks.
(5) Degradation of the color continued until the color was too dark to obtain a reading on the instrument after storage for one year.
(6) No further color degradation occurs.

It will be seen that the treatment of solutions of vinylaromatic resins in chlorinated solvents with lime vastly increases the color stability of the solutions and inhibits undesirable darkening of them with the passage of time. Moreover, the initial lime treatment improves the color of the initial solution.

The exact reason for the effectiveness is not known. It is known, however, that sizing resins are commonly produced from vinylaromatic monomers using Friedel-Crafts polymerization catalysts. We believe that the resins so produced contain traces of the Friedel-Crafts polymerization catalyst and further that chlorinated hydrocarbon solvents contain traces of hydrogen chloride. We believe that the vinylaromatic resin in combination with the hydrogen chloride in the presence of the catalyst produces the color in the solution. It is possible that some other mechanism is involved, and we do not predicate our invention upon that theory.

A variety of changes may be made in the foregoing procedures without departing from the invention. For example a variety of homopolymers and copolymers produced for vinyl-aromatic monomers may be used as sizing agents. Various chlorinated solvents such as perchlorethylene and 1,1,1-trichloroethane may also be employed. The temperature range of the solution may be adjusted to obtain a desired solution viscosity.

A solution which has become colored through passage of time may be treated with lime and the color thereby improved, as illustrated by another example. A solution prepared as outlined above is allowed to stand until it has a color reading of Saybolt +10. The solution is heated with lime as outlined above, and the color is improved to Saybolt +22. It is apparent that the solution may be treated at the time of preparation or just prior to use. When like tests were attempted on other solutions including an inhibitor or a steel disc, it was found that color could not be restored.

Observation of a series of solutions in course of preparation indicates that they acquire their initial color at about the time the resin is completely dissolved in the solvent. Lime treatment at that time prevents further degradation in color. Moreover, the treatment appears to improve the color over that observed at the time the resin disappeared into the solution.

We have found that the resin must be dissolved in the solvent for the lime treatment to be effective. Lime treatment of the solvent prior to preparation of the solution is ineffective. Reference may be made to an example. Perchlorethylene, prior to addition of a resin, is heated with 5 percent by weight lime, based on perchlorethylene, at 50°C for thirty minutes. The lime is removed by filtration and a 50 percent by weight solution is prepared by introducing into the perchlorethylene an alpha-methylstyrene/vinyltoluene resin having a ring and ball softening point of 120°C. The initial color of the solution is Saybolt +18, but after storage of the resin solution under fluorescent lamps, the color darkens so greatly that a reading cannot be obtained.

While we have illustrated and described a present preferred embodiment of the invention, it is to be understood that we do not limit ourselves thereto and that our invention may be otherwise variously practiced within the scope of the following claims.

We claim:

1. The method of inhibiting color deterioration in dry cleaning and sizing solutions comprising a vinylaromatic resin in a chlorinated solvent which method comprises treating the solution by contacting the solution with lime, allowing sufficient time and stirring to effect color stabilization, and thereafter filtering the lime from the solution.

2. The method of inhibiting color deterioration in dry cleaning and sizing solutions comprising a copolymer of alpha-methylstyrene and vinyltoluene in perchlorethylene which method comprises treating the solution with lime by introducing lime into the solution, allowing sufficient time and stirring to effect stabilization of the solution, and thereafter filtering the lime from the solution.

3. The method of dry cleaning and sizing which comprises preparing a solution of vinylaromatic resin in a chlorinated solvent then treating the solution with lime by introducing lime into the solution, allowing sufficient time and stirring to effect stabilization, thereafter filtering the lime from the solution, and then immersing fabrics to be cleaned in treated solution.

4. The method of claim 3 in which the resin is selected from the group consisting of alpha-methylstyrene/vinyl toluene, styrene, and tertiary-butyl styrene.

5. The method of claim 3 in which the resin is a copolymer of alpha-methylstyrene and vinyltoluene.

6. The method of claim 3 in which the solvent is selected from the group consisting of perchlorethylene and 1,1,1-trichloroethane.

7. The method of claim 5 in which the resin has a softening point (ring and ball) of about 120°C.

8. The method of claim 3 in which the resin is a copolymer of alpha-methylstyrene and vinyltoluene and the solvent is perchlorethylene.

* * * * *